US008045965B2

(12) United States Patent
Shaffer et al.

(10) Patent No.: US 8,045,965 B2
(45) Date of Patent: Oct. 25, 2011

(54) SYSTEM AND METHOD FOR VENUE-TO-VENUE MESSAGING

(75) Inventors: Justin Shaffer, New York, NY (US); Joseph Inzerillo, New York, NY (US); Robert A. Bowman, Westport, CT (US)

(73) Assignee: MLB Advanced Media L.P., New York, NY (US)

( * ) Notice: Subject to any disclaimer, the term of this patent is extended or adjusted under 35 U.S.C. 154(b) by 557 days.

(21) Appl. No.: 11/701,531

(22) Filed: Feb. 2, 2007

(65) Prior Publication Data

US 2008/0189371 A1    Aug. 7, 2008

(51) Int. Cl.
H04M 3/42 (2006.01)
(52) U.S. Cl. .................. 455/414.1; 455/466; 455/412.1; 386/223; 386/230
(58) Field of Classification Search .................. 455/566, 455/517, 412.1, 466, 414.1, 426.2; 709/206; 386/46, 223, 230
See application file for complete search history.

(56) References Cited

U.S. PATENT DOCUMENTS

| | | | |
|---|---|---|---|
| 5,872,926 A * | 2/1999 | Levac et al. ................... 709/206 |
| 6,720,867 B2 | 4/2004 | Baker | |
| 6,980,113 B1 | 12/2005 | Uehran | |
| 6,996,413 B2 | 2/2006 | Inselberg | |
| 2004/0171381 A1 * | 9/2004 | Inselberg .................... 455/426.2 |
| 2004/0219951 A1 * | 11/2004 | Holder .......................... 455/566 |
| 2005/0160155 A1 * | 7/2005 | Geekee et al. ................. 709/220 |
| 2005/0254443 A1 * | 11/2005 | Campbell et al. ............. 370/310 |
| 2006/0094409 A1 * | 5/2006 | Inselberg .................... 455/414.1 |
| 2006/0104600 A1 * | 5/2006 | Abrams .......................... 386/46 |
| 2006/0128404 A1 * | 6/2006 | Klassen et al. ................. 455/466 |
| 2007/0202900 A1 * | 8/2007 | Inselberg ...................... 455/500 |
| 2007/0261084 A1 * | 11/2007 | Smith et al. ..................... 725/86 |
| 2008/0189371 A1 * | 8/2008 | Shaffer et al. .................. 709/206 |

OTHER PUBLICATIONS

"Big Screen Text Messaging During Events Enhances the Experience," Venues Today, Sep. 28, 2005, pp. 1-2; http://www.vibes.com/corporate/news/2005/092805VenuesToday.htm.
Hord, "How SMS Works," Howstuffworks, pp. 1-5; http://electronics.howstuffworks.com/sms.htm/printable.

* cited by examiner

Primary Examiner — Jean A Gelin
Assistant Examiner — Nathan Taylor
(74) Attorney, Agent, or Firm — Foley & Lardner LLP

(57) ABSTRACT

A system and method is provided for enabling venue-to-venue communication. A message is sent from a messaging device located in a first venue. The system receives the message via a communications network. The system transmits the message via the communications network to a local venue exchange associated with a second venue. The message is presented to an audience present at the second venue.

25 Claims, 4 Drawing Sheets

SYSTEM AND METHOD FOR VENUE-TO-VENUE MESSAGING

BACKGROUND OF THE INVENTION

The following description of the background of the invention is provided simply as an aid in understanding the invention and is not admitted to describe or constitute prior art to the invention.

The present invention relates generally to the field of audience interaction systems. Specifically, the present invention relates to audience messaging systems.

Figure 1:
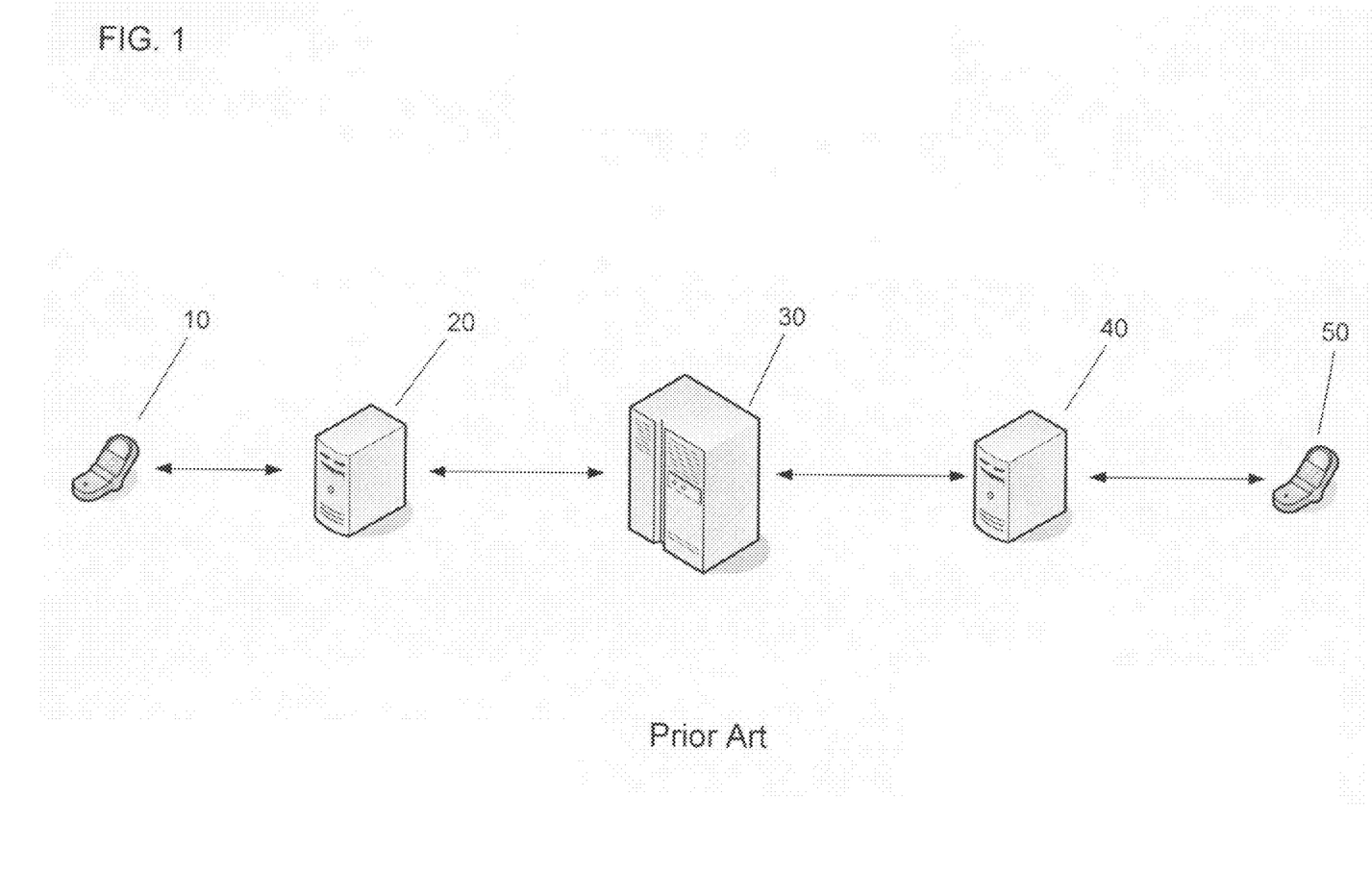
FIG. 1 is a system architecture for a conventional messaging service.

Methods for sending electronic messages such as the short message service (SMS) or text messaging allows a user to send simple text messages from a mobile device, computer or handheld device to a recipient device such as a mobile phone. FIG. 1 illustrates a general communications architecture for mobile device to mobile device messaging. When a text message is sent from a mobile device 10 it is first received by a mobile switching center (MSC) 20. The MSC 20 then forwards the message to a short message service center (SMSC) 30. The SMSC 30 routes SMS messages within a wireless provider's network. The text message is saved at the SMSC and then forwarded to a second MSC 40 associated with the recipient device 50 which then routes the text message to a recipients mobile device 50. SMS messages are stored by the SMSC until the destination device is available to receive the message. Thus, the save and forward capability of the SMSC guarantees deliver of the SMS message.

Figure 2:
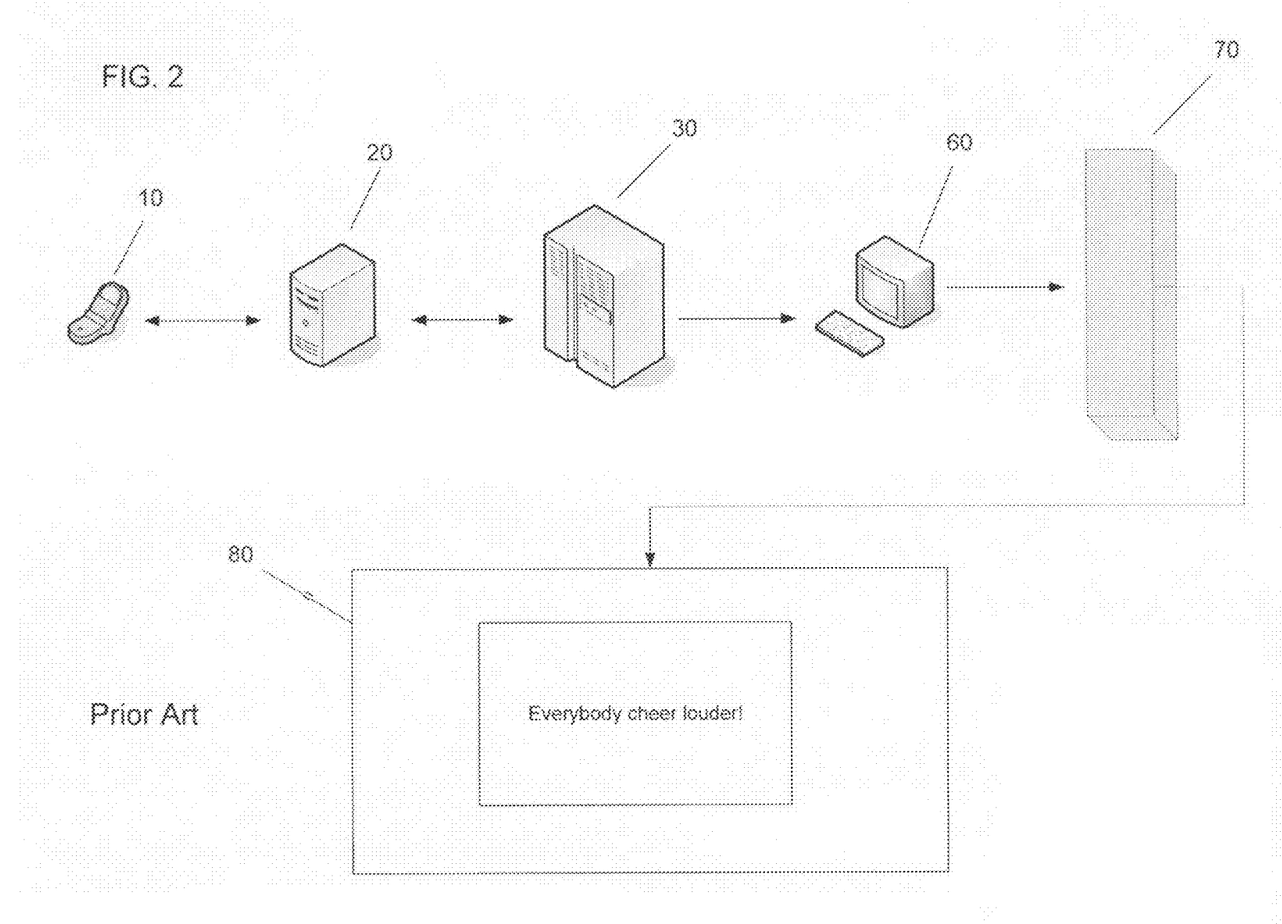
FIG. 2 is a system architecture for an audience-to-venue display messaging system.

Text messaging is an increasingly popular communication method. Several commercial applications for text messaging exist. For example, companies use broadcast text messages to send information to multiple consumers. Text messaging is used by television programs to allow viewers to participate in interactive polls. In addition, venues for concerts and sporting events use displays such as giant screens, "JUMBOTRONS®, "ribbon boards", video displays in the venue, electronic marquees and scoreboards to display text messages sent from audience members. FIG. 2 shows an exemplary communication architecture for a conventional venue messaging system. A user sends a message on her mobile device 10 to a number associated with the venue's display 80. The message is transmitted to a MSC 20 which routs the message to a SMSC 30. The SMSC 30 stores the message and then routes the message to a message server 60. The message server 60 passes the message through a content filter 70. The filtered message is then shown on the venue display 80.

It is common for multiple events such as concerts or sporting events to occur at different venues at the same time. Thus, a system and method is desired that will allow an audience member located in one venue to send a message to be displayed to audience members attending a different event at a separate venue.

SUMMARY OF THE INVENTION

According to one embodiment of the invention, a system for venue-to-venue messaging comprises a messaging device, located at a first venue, configured to transmit a message, a communications network configured to receive the message and route the message to a second venue, a local venue exchange that is operably connected to the communications network and is associated with the second venue. The local venue exchange is configured to receive and process the message. The system further comprises a content filter configured to censor and edit the message and a venue display for presenting the message to an audience in attendance at the second venue.

According to another embodiment of the invention, a method for enabling venue-to-venue messaging includes the steps of receiving a message via a communications network, wherein the message is sent from a messaging device located in a first venue, transmitting the message via a communications network to a local venue exchange associated with a second venue and presenting the message to an audience in attendance at the second venue.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION OF THE PREFERRED EMBODIMENTS

Embodiments of the present invention will be described below with reference to the accompanying drawings. It should be understood that the following description is intended to describe exemplary embodiments of the invention, and not to limit the invention.

Figure 3:
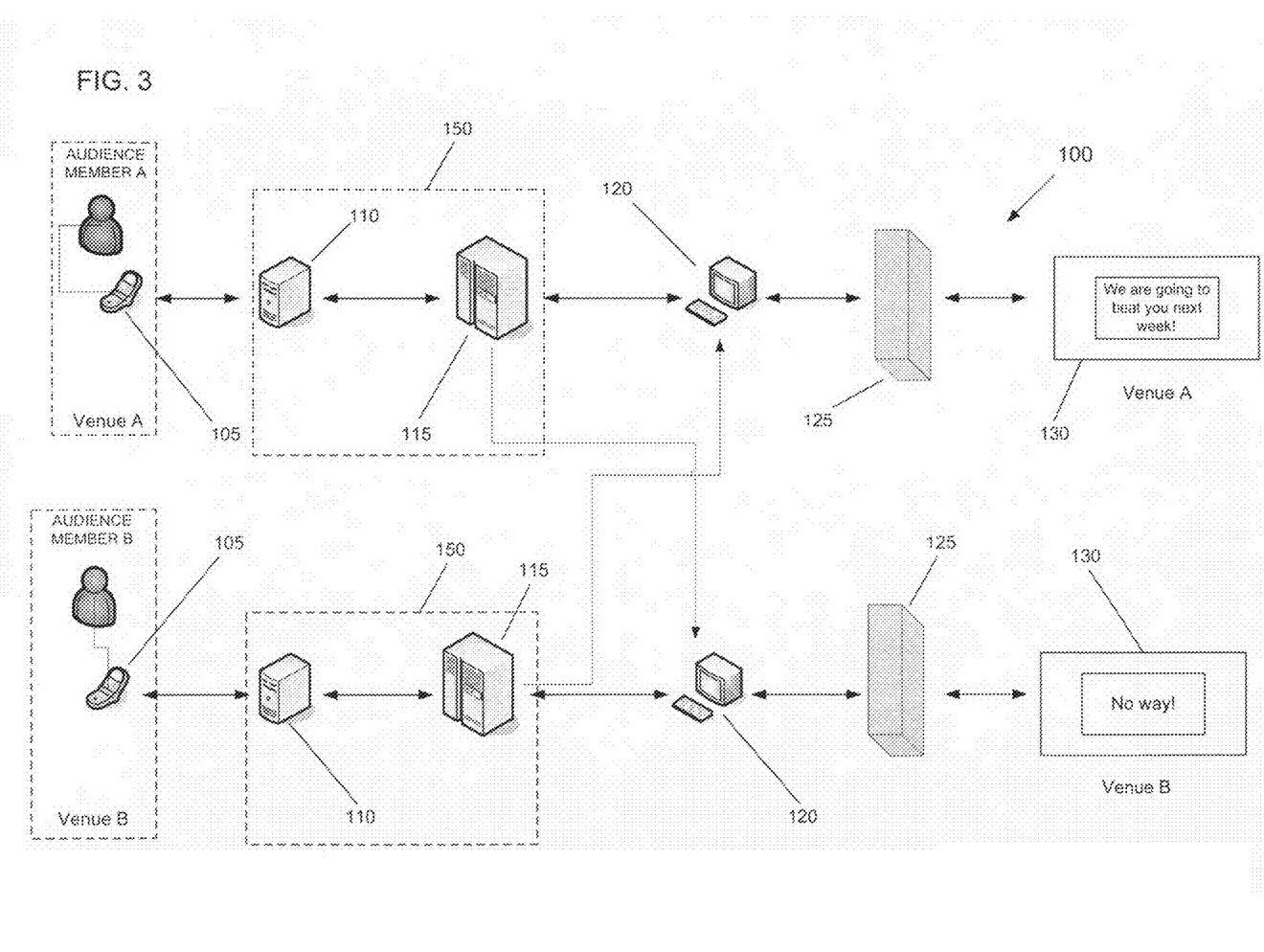
FIG. 3 is a system architecture for a venue-to-venue messaging system according to one embodiment of the invention.

FIG. 3 is a system architecture for a venue-to-venue messaging system 100 according to one embodiment of the invention. The venue-to-venue messaging system allows audience member A, attending an event at venue A, to send a message to venue B. That message may be displayed to all the audience members at venue B. In the alternative, the message sent to venue B may cause a display at venue B to present the audience members at venue B with other text, video, audio, etc. Similarly, an audience member present at venue B may send a message to be displayed at venue A. In addition, the system shown in FIG. 3 retains the functionality of the conventional audience messaging system shown in FIG. 2.

A two-venue system is shown only for illustration purposes. It should be understood that the system may be configured to send and receive messages for any number of venues. Further, while text messages are shown in FIG. 3, it should be understood that the messages transmitted may be one or more of audio, visual or text messages. For example, audience member A may attending an event at venue A, may send a video and/or song to venue B.

The venue-to-venue messaging system 100 and method will now be described in more detail. As stated above, audience member A, located at venue A, first inputs a message into a messaging device 105. The messaging 105 device may be any one of several types of devices including but not limited to a mobile phone, PDA, laptop, pager, etc. In addition, the messaging device could be a device provided to the audience members by the venue for the specific purpose of transmitting messages from the audience members. Preferably, the messaging device 105 is a consumer mobile device such as a cell phone. The audience member sending the message must specify what number the message is to be sent to. The number identifies the recipient of the message. As shown in FIG. 3, audience member A wishes to send a message to venue B to be displayed to venue B's audience members and audience member B wishes to send a message to venue A to be displayed to venue A's audience members. The messages are transmitted via a communications network 150 described in more detail below. The communications network 150 may be any type of two-way network (e.g., a telephone network, cellular telephone network. etc.).

The messaging device 105 transmits the message to a local router or switch 110. The local router 110 is a system implemented with hardware and software for receiving and routing messages through the communications network 150. Preferably, the local router 110 is a mobile switching center (MSC) that is associated with the messaging device 105. Alternatively, the local router 110 may be a local exchange connected to all telephone enabled devices in the vicinity of venue A.

From the local router 110, the message is transmitted to a main router or switch 115. The main router 115 is a system consisting of hardware and software for handling a large volume of messages received from one or more local routers 110. Preferably, the main router 115 is a short message service center (SMSC). Alternatively, the main router may be what is known in conventional telephone networks as a main exchange. The main router 115 saves all the messages it receives in memory.

After saving the message, according to one embodiment of the invention, the main router 115 sends the message to a local venue exchange 120. For example, as shown in FIG. 3, if audience member A intends to send the message to venue B, the main router 115 sends the message to a local venue exchange 120 associated with venue B. It should be understood that depending on the communication network 150 configuration and the distance between venue A and venue B the message may be routed through additional main and/or local routers (and via satellites if necessary) before reaching the local venue exchange 120. The local venue exchange 120 is a system comprised of hardware and software for receiving and processing messages intended to be displayed at a venue. The local venue exchange 120 may be any one of a server, computer, mainframe, router, switch, etc. The local venue exchange 120 is in close proximity to the receiving venue and preferably may be located in the venue.

The local venue exchange 120 processes the received messages and prepares those messages for audience viewing. According to one embodiment of the invention, the messages received by the local venue exchange 120 are passed through a content filter 125 before they are displayed. The content filter 125 edits the messages for length, content and other criteria. The content filter 125 may be implemented in computer hardware or software or a combination of both. The content filter 125 may be fully automated or allow for a user to view and screen messages as well. Preferably, the content filter 125 is a separate system, although it may also be implemented as a subcomponent of the local venue exchange 120. According to one embodiment of the invention, the content filter 125 edits or rejects messages based on criteria specific to its venue. For example, the content filter 125 of venue B may determine whether messages sent from venue A are displayed based on venue B filtering criteria.

Figure 4:
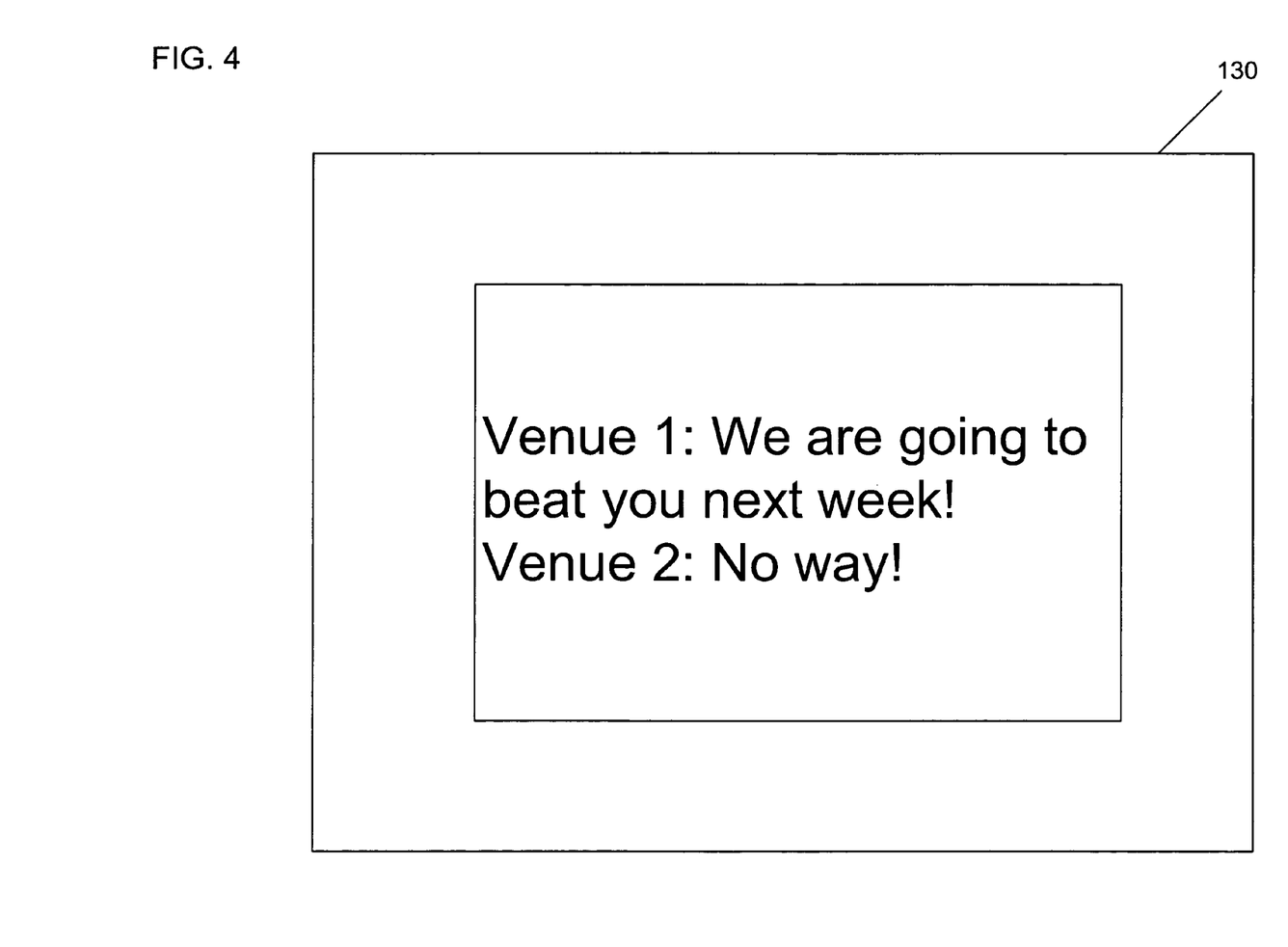
FIG. 4 is a venue-to-venue display according to one embodiment if the invention.

Once filtered, the venue-to-venue messaging system 100 then displays the message on a venue display 130 so that audience members at the venue may view the message. The venue display 130 may be a scoreboard, JUMBOTRON®, electronic marquee or any other conventional display system used in venues. According to one embodiment of the invention, and as illustrated in FIG. 4, the local venue exchange 120 and the venue display 130 are configured to simultaneously display both messages that are sent from audience members at the venue and messages that are received. This configuration effectively displays to the audience the conversation it is having between itself and another venue. According to another embodiment of the invention, the venue-to-venue messaging system 100 is configured such that images displayed on venue A's display 130 are displayed on venue B's display 130. Accordingly, images displayed on venue B's display 130 can be displayed on venue A's display 130.

The above-described invention has several advantages. For example, the system provides the opportunity for audience members to actively communicate with audience members at a different venue. This provides for an unprecedented level of fan interaction. In addition, since audience members are more likely to look at the venue display to read received messages, the area surrounding the venue display has increased value to advertisers.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A system for enabling venue-to-venue messaging, comprising:
   a first messaging device, located at a first venue where a first event is occurring, configured to transmit a first user generated message;
   a second messaging device, located at a second venue where a second event is occurring, configured to transmit a second user generated message;
   a communications network, configured to receive the first user generated message and route the first user generated message to the second venue where the second event is occurring concurrently with the first event, and configured to receive the second user generated message and route the second user generated message to the first venue where the first event is occurring concurrently with the second event;
   a first local venue exchange operably connected to the communications network and associated with the first venue, wherein the first local venue exchange is configured to receive and process the second user generated message transmitted from the second messaging device at the second venue;
   a second local venue exchange operably connected to the communications network and associated with the second venue, wherein the second local venue exchange is configured to receive and process the first user generated message transmitted from the first messaging device at the first venue;
   a first content filter configured to censor and edit the second user generated message;

a second content filter configured to censor and edit the first user generated message; and a first venue display located at the first venue; and a second venue display located at the second venue, wherein the first and second venue displays are configured to simultaneously display the first and second user generated messages to audiences in attendance at the first and second event.

2. The system of claim 1, wherein the first messaging device is a cell phone of an audience member at the first venue.

3. The system of claim 1, wherein the first messaging device is one of a PDA, laptop, pager, telephone or computer.

4. The system of claim 1, wherein the first and second venue are any one of a ballpark, stadium, coliseum, field, concert hall, amphitheatre, auditorium or gymnasium.

5. The system of claim 1, wherein the first user generated message is a text message.

6. The system of claim 1, wherein the first user generated message is one of an image, audio or video message.

7. The system of claim 1, wherein the communications network is a wireless cellular telephone network.

8. The system of claim 1, wherein the communications network is a two-way network.

9. The system of claim 1, wherein the second local venue exchange is located in the second venue.

10. The system of claim 1, wherein the second venue display located at the second venue is any one of a LCD screen, scoreboard or electronic marquee that is visible to all the audience present at the second venue.

11. The system of claim 1, wherein the first and second event are any one of a sporting event or concert.

12. A method for enabling venue-to-venue messaging, comprising:

receiving a first user generated message, via a communications network, wherein the first user generated message is sent from a first messaging device located in a first venue where a first event is occurring;

receiving a second user generated message, via a communications network, wherein the second user generated message is sent from a second messaging device located in a second venue where a second event is occurring;

transmitting the first user generated message via the communications network to a second local venue exchange associated with the second venue where the second event is occurring concurrently with the first event;

transmitting the second user generated message via a communications network to a first local venue exchange associated with the first venue where the first event is occurring concurrently with the second event;

simultaneously presenting the first and second user generated messages on a first venue display located at the first venue to an audience in attendance at the first event; and simultaneously presenting the first and second user generated messages on a second venue display located at the second venue to an audience in attendance at the second event.

13. The method of claim 12, wherein the step of simultaneously presenting the first and second user generated messages on the first venue display further comprises:

passing the first and second user generated messages through a content filter; and editing the first and second user generated messages according to criteria specified by the content filter.

14. The method of claim 12, wherein the first user generated message is a text message.

15. The method of claim 12, wherein the first user generated message is one of an image, audio or video message.

16. The method of claim 12, wherein the communications network is a wireless cellular telephone network.

17. The method of claim 12, wherein the communications network is a two-way network.

18. The method of claim 12, wherein the first messaging device is a wireless cellular telephone.

19. The method of claim 12, wherein the first messaging device is one of a PDA, laptop, pager, telephone or computer.

20. The method of claim 12, wherein the first and second venue are any one of a ballpark, stadium, coliseum, field, concert hall, amphitheatre, auditorium or gymnasium.

21. The method of claim 12, wherein the second local venue exchange is located in the second venue.

22. The method of claim 12, wherein the second venue display located at the second event is any one of a LCD screen, scoreboard or electronic marquee that is visible to all the audience present at the second venue.

23. The method of claim 12, wherein the first and second event are any one of a sporting event or concert.

24. A method for venue-to-venue messaging, comprising:

providing an audience member in attendance at a first venue where a first event is occurring with a first wireless messaging device;

providing an audience member in attendance at a second venue where a second event is occurring with a second wireless messaging device;

receiving a first user generated message input by the audience member with the first wireless messaging device at a cellular communications network, wherein the first user generated message is intended to be delivered to the second venue where the second event is occurring concurrently with the first event;

receiving a second user generated message input by the audience member with the second wireless messaging device at a cellular communications network, wherein the second user generated message is intended to be delivered to the first venue where the first event is occurring concurrently with the second event;

transmitting the first user generated message from the cellular communications network to a second local venue exchange associated with the second venue;

transmitting the second user generated message from the cellular communications network to a first local venue exchange associated with the first venue;

filtering and editing the content of the first and second user generated messages; and simultaneously presenting the first and second user generated messages on a first venue display located at the first venue to audience members in attendance at the first event; and simultaneously presenting the first and second user generated messages on a second venue display located at the second venue to an audience in attendance at the second event.

25. The method of claim 24, wherein the first and second event are any one of a sporting event or concert.

* * * * *

(12) EX PARTE REEXAMINATION CERTIFICATE (9800th)
United States Patent
Shaffer et al.

(10) Number: US 8,045,965 C1
(45) Certificate Issued: Aug. 15, 2013

(54) SYSTEM AND METHOD FOR VENUE-TO-VENUE MESSAGING

(75) Inventors: Justin Shaffer, New York, NY (US);
Joseph Inzerillo, New York, NY (US);
Robert A. Bowman, Westport, CT (US)

(73) Assignee: MLB Advanced Media, L.P., New York, NY (US)

Reexamination Request:
No. 90/012,489, Sep. 11, 2012

Reexamination Certificate for:
Patent No.: 8,045,965
Issued: Oct. 25, 2011
Appl. No.: 11/701,531
Filed: Feb. 2, 2007

(51) Int. Cl.
*H04M 3/42* (2006.01)

(52) U.S. Cl.
USPC ............ 455/414.1; 455/466; 455/412.1; 386/223; 386/230

(58) Field of Classification Search
None
See application file for complete search history.

(56) References Cited

To view the complete listing of prior art documents cited during the proceeding for Reexamination Control Number 90/012,489, please refer to the USPTO's public Patent Application Information Retrieval (PAIR) system under the Display References tab.

*Primary Examiner* — Minh Dieu Nguyen (57) ABSTRACT

A system and method is provided for enabling venue-to-venue communication. A message is sent from a messaging device located in a first venue. The system receives the message via a communications network. The system transmits the message via the communications network to a local venue exchange associated with a second venue. The message is presented to an audience present at the second venue.

US 8,045,965 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-25 is confirmed.

New claims 26-41 are added and determined to be patentable.

26. *A system for enabling venue-to-venue messaging, comprising:*
  *a first messaging device, located at a first venue where a first event is occurring, configured to transmit a first user generated message;*
  *a second messaging device, located at a second venue where a second event is occurring, configured to transmit a second user generated message, wherein the first user generated message is not transmitted to the second messaging device, and wherein the second user generated message is not transmitted to the first messaging device;*
  *a communications network, configured to receive the first user generated message and route the first user generated message to the second venue where the second event is occurring concurrently with the first event, and configured to receive the second user generated message and route the second user generated message to the first venue where the first event is occurring concurrently with the second event;*
  *a first local venue exchange operably connected to the communications network and associated with the first venue, wherein the first local venue exchange is configured to receive and process the second user generated message transmitted from the second messaging device at the second venue;*
  *a second local venue exchange operably connected to the communications network and associated with the second venue, wherein the second local venue exchange is configured to receive and process the first user generated message transmitted from the first messaging device at the first venue;*
  *a first content filter configured to censor and edit the second user generated message;*
  *a second content filter configured to censor and edit the first user generated message; and*
  *a first venue display located at the first venue; and*
  *a second venue display located at the second venue, wherein the first and second venue displays are configured to simultaneously display the first and second user generated messages to audiences in attendance at the first and second event.*

27. *The system of claim 26, wherein the first messaging device is a cell phone of an audience member at the first venue.*

28. *The system of claim 26, wherein the first messaging device is one of a PDA, laptop, pager, telephone or computer.*

29. *The system of claim 26, wherein the first and second venue are any one of a ballpark, stadium, coliseum, field, concert hall, amphitheatre, auditorium or gymnasium.*

30. *The system of claim 26, wherein the first user generated message is a text message.*

31. *The system of claim 26, wherein the first user generated message is one of an image, audio or video message.*

32. *The system of claim 26, wherein the second venue display located at the second venue is any one of a LCD screen, scoreboard or electronic marquee that is visible to all the audience present at the second venue.*

33. *A method for enabling venue-to-venue messaging, comprising:*
  *receiving a first user generated message, via a communications network, wherein the first user generated message is sent from a first messaging device located in a first venue where a first event is occurring;*
  *receiving a second user generated message, via a communications network, wherein the second user generated message is sent from a second messaging device located in a second venue where a second event is occurring, wherein the first user generated message is not transmitted to the second messaging device, and wherein the second user generated message is not transmitted to the first messaging device;*
  *transmitting the first user generated message via the communications network to a second local venue exchange associated with the second venue where the second event is occurring concurrently with the first event;*
  *transmitting the second user generated message via a communications network to a first local venue exchange associated with the first venue where the first event is occurring concurrently with the second event;*
  *simultaneously presenting the first and second user generated messages on a first venue display located at the first venue to an audience in attendance at the first event; and*
  *simultaneously presenting the first and second user generated messages on a second venue display located at the second venue to an audience in attendance at the second event.*

34. *The method of claim 33, wherein the step of simultaneously presenting the first and second user generated messages on the first venue display further comprises:*
  *passing the first and second user generated messages through a content filter; and*
  *editing the first and second user generated messages according to criteria specified by the content filter.*

35. *The method of claim 33, wherein the first user generated message is a text message.*

36. *The method of claim 33, wherein the first user generated message is one of an image, audio or video message.*

37. *The method of claim 33, wherein the first messaging device is a wireless cellular telephone.*

38. *The method of claim 33, wherein the first messaging device is one of a PDA, laptop, pager, telephone or computer.*

39. *The method of claim 33, wherein the first and second venue are any one of a ballpark, stadium, coliseum, field, concert hall, amphitheatre, auditorium or gymnasium.*

40. *The method of claim 33, wherein the second venue display located at the second event is any one of a LCD screen, scoreboard or electronic marquee that is visible to all the audience present at the second venue.*

41. *A method for venue-to-venue messaging, comprising:*
  *providing an audience member in attendance at a first venue where a first event is occurring with a first wireless messaging device;* providing an audience member in attendance at a second venue where a second event is occurring with a second wireless messaging device;

receiving a first user generated message input by the audience member with the first wireless messaging device at a cellular communications network, wherein the first user generated message is intended to be delivered to the second venue where the second event is occurring concurrently with the first event;

receiving a second user generated message input by the audience member with the second wireless messaging device at a cellular communications network, wherein the second user generated message is intended to be delivered to the first venue where the first event is occurring concurrently with the second event, wherein the first user generated message is not transmitted to the second messaging device, and wherein the second user generated message is not transmitted to the first messaging device;

transmitting the first user generated message from the cellular communications network to a second local venue exchange associated with the second venue;

transmitting the second user generated message from the cellular communications network to a first local venue exchange associated with the first venue;

filtering and editing the content of the first and second user generated messages; and simultaneously presenting the first and second user generated messages on a first venue display located at the first venue to audience members in attendance at the first event; and simultaneously presenting the first and second user generated messages on a second venue display located at the second venue to an audience in attendance at the second event.

* * * * *